(12) United States Patent
Yoshiura et al.

(10) Patent No.: US 7,453,590 B2
(45) Date of Patent: Nov. 18, 2008

(54) METHOD FOR MANAGING ELECTRONIC APPARATUS, ELECTRONIC APPARATUS, AND MANAGEMENT SYSTEM FOR THE SAME

(75) Inventors: Syoichiro Yoshiura, Ikoma-gun (JP); Tsutomu Yoshimoto, Yamatotakada (JP)

(73) Assignee: Sharp Kabushiki Kaisha, Osaka (JP)

( * ) Notice: Subject to any disclaimer, the term of this patent is extended or adjusted under 35 U.S.C. 154(b) by 892 days.

(21) Appl. No.: 10/052,163

(22) Filed: Jan. 17, 2002

(65) Prior Publication Data

US 2002/0196458 A1    Dec. 26, 2002

(30) Foreign Application Priority Data

Jun. 26, 2001    (JP)    ............................. 2001-193565

(51) Int. Cl.
*G06K 15/00*    (2006.01)
*G06F 3/12*    (2006.01)

(52) U.S. Cl. ..................................... 358/1.15; 358/1.13

(58) Field of Classification Search ................ 358/1.15, 358/1.14, 1.16, 1.13, 1.9; 702/182, 183, 702/184, 188
See application file for complete search history.

(56) References Cited

U.S. PATENT DOCUMENTS

| | | | | |
|---|---|---|---|---|
| 5,950,148 | A * | 9/1999 | Nakagawa et al. | .......... 702/182 |
| 6,072,595 | A | 6/2000 | Yoshiura et al. | |
| 6,721,685 | B2 * | 4/2004 | Kodama | ..................... 702/184 |
| 6,871,243 | B2 * | 3/2005 | Iwase et al. | ................... 710/62 |
| 2002/0001099 | A1 * | 1/2002 | Okuda et al. | ................ 358/1.15 |
| 2002/0053018 | A1 * | 5/2002 | Ota et al. | ......................... 713/1 |

FOREIGN PATENT DOCUMENTS

| | | |
|---|---|---|
| JP | 02-172348 | 7/1990 |
| JP | 03-143192 | 6/1991 |
| JP | 05-316241 | 11/1993 |
| JP | 06-110539 | 4/1994 |
| JP | 09-212725 | 8/1997 |
| JP | 09-312695 | 12/1997 |
| JP | 11-227299 | 8/1999 |
| JP | 2000-020767 | 1/2000 |
| JP | 2000-324565 | 11/2000 |

* cited by examiner

*Primary Examiner*—Gabriel I Garcia
(74) *Attorney, Agent, or Firm*—David G. Conlin; Steven M. Jensen; Edwards Angell Palmer & Dodge LLP

(57) ABSTRACT

A digital image processing multifunction apparatus is provided with an apparatus-side communication controlling section to communicate with either of portable terminals. When receiving a demand of the apparatus management information of the electronic apparatus from either of portable terminals, the apparatus-side communication controlling section identifies the portable terminal on the basis of a terminal information controlling section and transmits the apparatus management information in accordance with the portable terminal from an information management table. Thus, even in case where it is difficult to install and manage the electronic apparatus under a network environment, it is possible to provide a management system for the electronic apparatus which can collect apparatus management information relating to electronic apparatus easily and efficiently by utilizing portable terminals such as portable telephones which currently most people subscribe for so as to take proper actions promptly, without introducing a network environment.

11 Claims, 5 Drawing Sheets

METHOD FOR MANAGING ELECTRONIC APPARATUS, ELECTRONIC APPARATUS, AND MANAGEMENT SYSTEM FOR THE SAME

FIELD OF THE INVENTION

The present invention relates to a method for managing an electronic apparatus, an electronic apparatus, and a management system for the electronic apparatus, in which management levels of persons, such as a general user, a manager, and a serviceman, who own their portable terminals are grasped and then apparatus management information which varies depending on the management levels of an owner of the portable terminal is reported to the portable terminal in the case of reporting to the portable terminal on the apparatus management information of the electronic apparatus, and more specifically, in which the apparatus management information is transmitted from the portable terminal to an apparatus management center so as to make remote management of the electronic apparatus possible.

BACKGROUND OF THE INVENTION

Conventionally, known are remote management systems in which information such as conditions of an electronic apparatus is gathered at a remote location from the place where the electric apparatus is installed, so as to grasp the conditions of the electronic apparatus. Among such remote management systems, for example, there is a remote management system in which a remote management function via communication circuits such as telephone lines or via electronic mails is mounted in an electronic apparatus or a remote management system in which such a function is exclusively installed.

As this kind of technique, for example, a facsimile apparatus is disclosed in Japanese Laid-Open Patent Publication No. 172348/1990 (Tokkaihei 2-172348, published on Jul. 3, 1990). In this facsimile apparatus, an electronic mail function is provided so that information such as facsimile transmitting result information and facsimile receiving result information, and trouble detection information can be reported to a manager by electronic mail via a computer network.

However, the facsimile apparatus, which is the above conventional electric apparatus, suffers from a problem that this function cannot be operative effectively unless the facsimile apparatus is not installed at a place where a computer network environment is prepared.

Further, if trouble information, for example, of the facsimile apparatus is reported to a service company for a maintenance of the facsimile apparatus, another requirement is added such that the facsimile apparatus must be installed at a place where the Internet environment is prepared. Thus, the remote monitoring system using this reporting system does not function at all locations where the facsimile apparatus is installed. That is, it is a problem to prepare electronic mail environment specially for the facsimile apparatus installed as a unit.

Furthermore, in the above-described remote monitoring of the facsimile apparatus by electronic mail, a service center is designed to carry out remote monitoring of the facsimile apparatus by electronic mail by renting the Internet environment partially at the place where the facsimile apparatus is installed. Thus, if the facsimile apparatus is monitored all the time, the confirmation as to the above fact is necessary with respect to the user before installing the facsimile apparatus. Therefore, proceeding problems such as a functional explanation and a fee incurred by a partial use of the Internet environment might occur. As a result, a problem arises such that the electronic mail function is operative in one place, but not in other place when the electronic mail function is intended to install in all the facsimile apparatus.

In addition, installation of the electronic mail function in all facsimile apparatuses causes an increase in cost of the facsimile apparatus itself.

Meanwhile, as this kind of another prior art, for example, a method for bidirectional remote control communication is disclosed in Japanese Laid-Open Patent Publication No. 324565/2000 (Tokkai 2000-324565, published on Nov. 24, 2000). The method for bidirectional remote control communication disclosed in this patent publication is such that information of home electronic controller is collected by using the bidirectional remote controller, and if a fault is detected, information is transmitted to a fault transmitter connected to a network so as to report it to a service station.

However, for receiving such service, it is necessary for users to prepare a network environment. Therefore, investment in a network environment is required, which causes a problem that users hesitate to introduce such a system.

SUMMARY OF THE INVENTION

An object of the present invention is to provide a method for managing an electronic apparatus, an electronic apparatus, and a management system for the electronic apparatus which can collect apparatus management information relating to electronic apparatus easily and efficiently by utilizing portable terminals such as portable telephones which currently most people subscribe for so as to perform a proper action promptly, without introducing a network environment, even in case where it is difficult to install and manage the electronic apparatus under a network environment.

To achieve the object, the method for managing electronic apparatuses of the present invention, the electronic apparatus has the step of:

causing the electronic apparatuses to verify identification information of a portable terminal which demands apparatus management information with respect to the electronic apparatus, and transmit the apparatus management information in accordance with the portable terminal to the portable terminal which demands the apparatus management information.

According to the invention, it is possible to acquire the apparatus management information of the electronic apparatus by the portable terminal such as a portable telephone.

In this case, in the present invention, when the electronic apparatus receives a demand of the apparatus management information of the electronic apparatus from the portable terminal, the electronic apparatus verifies the identification information of the portable terminal and transmits the apparatus management information which varies depending on the portable terminal.

Thus, it is possible to limit the content of the apparatus management information of the electronic apparatus to be reported in accordance with the apparatus management levels of owners, for example, a serviceman, a manager, and a general user, of the portable terminal who demands the apparatus management information.

As a result, it is possible to acquire the apparatus management information of the electronic apparatus by the portable terminal such as a portable telephone which has been recently owned among people, and it is possible for the electronic apparatus to report the apparatus management information in accordance with the apparatus management levels of owners of the portable terminals.

Therefore, even in case where it is difficult to install and manage the electronic apparatus under a network environment, it is possible to provide a management system for the electronic apparatus which can collect apparatus management information relating to electronic apparatus easily and efficiently by utilizing portable terminals such as portable telephones which currently most people subscribe for so as to take a proper action promptly, without introducing a network environment.

To achieve the object, the electronic apparatus of the present invention is provided with apparatus-side communication controlling means for communicating with either of portable terminals, the apparatus-side communication controlling means has:

inside-apparatus management information storage means for storing the apparatus management information of a main body of the electronic apparatus in plural levels, identification information storage means for storing identification information to identify the portable terminal of a communicating party, apparatus-side controlling means for identifying the portable terminal in accordance with the identification information in the identification information storage means when a demand for the apparatus management information of the electronic apparatus from either of the portable terminals, and for transmitting the apparatus management information of the level in accordance with the portable terminal from the inside-apparatus management information storage means.

According to this invention, it is possible to limit the content of the apparatus management information of the electronic apparatus to be reported in accordance with the apparatus management levels of owners, for example, a serviceman, a manager, and a general user, of the portable terminal who demands the apparatus management information.

As a result, it is possible to acquire the apparatus management information of the electronic apparatus by the portable terminal such as a portable telephone which has been recently owned among people, and it is possible for the electronic apparatus to report the apparatus management information in accordance with the apparatus management levels of owners of the portable terminals.

Therefore, even in case where it is difficult to install and manage the electronic apparatus under a network environment, it is possible to provide an electronic apparatus which can collect apparatus management information relating to electronic apparatus easily and efficiently by utilizing portable terminals such as portable telephones which currently most people subscribe for so as to take a proper action promptly, without introducing a network environment.

To achieve the object, the management system is provided with:

a plurality of the electronic apparatuses, an apparatus management center where management of the plurality of electronic apparatuses is performed synthetically, terminal-side communication controlling means, and a portable terminal having a display section, the terminal-side communication controlling means further including:

inherent information management means for storing identification information of the portable terminal, application means for storing application softs relating to acquisition of apparatus management information of the electronic apparatus and transmission to the apparatus management center, storage means for storing the apparatus management information transmitted from the electronic apparatuses, communication means for communicating, and terminal-side controlling means for (a) communicating with either of the electronic apparatuses so as to acquire the apparatus management information, (b) displaying the apparatus management information that has been acquired on a display section, (c) storing the apparatus management information thus acquired in the storage means, and (d) enabling to transmit the apparatus management information stored in the storage means to the apparatus management center.

According to this invention, it is possible to acquire the apparatus management information of the electronic apparatus by the portable terminal such as a portable telephone which has been recently owned among people, and it is possible for the electronic apparatus to report the apparatus management information in accordance with the apparatus management levels of owners of the portable terminals.

Further, in the present invention, since it is possible to report the apparatus management information of the electronic apparatus, which was reported to the portable terminals, to the apparatus management center as a further reporting location (a further addressee), it is also possible for an electronic apparatus having no network environment to report the apparatus management information to the apparatus management center via the portable terminal. Therefore, the remote management of the electronic apparatus is possible.

Therefore, even in case where it is difficult to install and manage the electronic apparatus under a network environment, it is possible to provide a management system for the electronic apparatus which can collect apparatus management information relating to electronic apparatus easily and efficiently by utilizing portable terminals such as portable telephones which currently most people subscribe for so as to take a proper action promptly, without introducing a network environment.

For a fuller understanding of the nature and advantages of the invention, reference should be made to the ensuing detailed description taken in conjunction with the accompanying drawings.

DESCRIPTION OF THE EMBODIMENTS

Referring to FIG. 1 through FIG. 5, an embodiment of the present invention will be described below. Note that the present embodiment deals with the case where a digital image processing multifunction apparatus is adopted as an electronic apparatus. The digital image processing multifunction apparatus includes multifunction as to digital image processing, such as a copying machine, a printer and a facsimile. It should be noted that, the electronic apparatus is not necessarily limited to the digital image processing multifunction apparatus, other electronic apparatus can be adopted.

Figure 2:
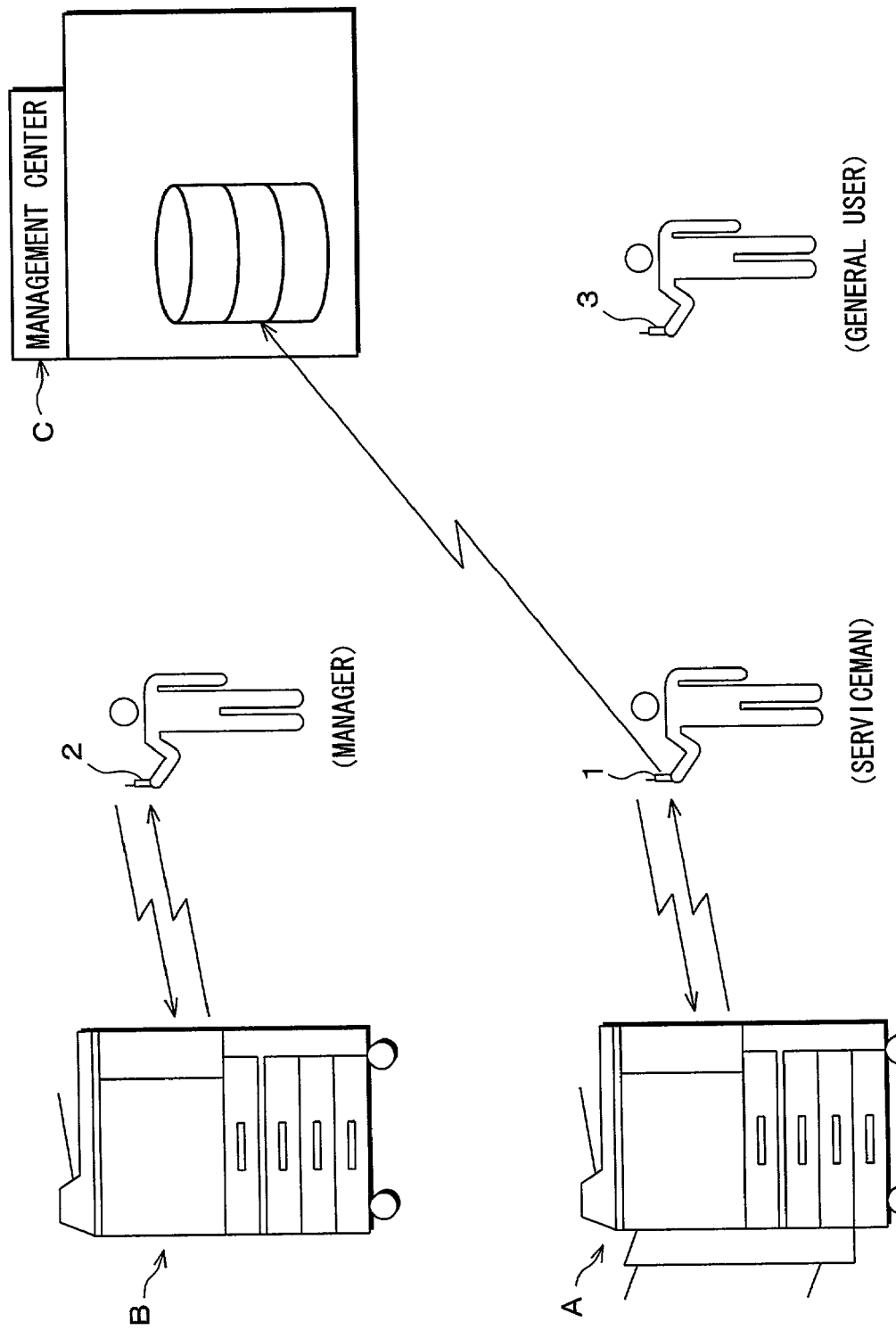
FIG. 2 is a schematic drawing illustrating a whole management system of the digital image processing multifunction apparatus.

As shown in FIG. 2, the management system of the electronic apparatus of the present embodiment is provided with digital image processing multifunction apparatuses A and B (the electronic apparatuses) installed at a plurality of locations, portable terminals 1, 2 and 3 to be owned, an apparatus management center C (a management center) which manages information of digital image processing multifunction apparatuses A and B. Note that, the portable terminals 1, 2 and 3 are the portable terminal such as a portable telephone provided with an electronic mail function and a function to communicate with external apparatuses. In the present embodiment, it is assumed that the portable terminal 1 indicates the one owned by a serviceman, the portable terminal 2 indicates the one owned by a manager at the location where the apparatus is installed, and the portable terminal 3 indicates the one owned by a general user.

Each of digital image processing multifunction apparatuses A and B installed at a plurality of locations has functions (a) to recognize the presence of the portable terminals 1, 2 and 3, (b) to communicate with the portable terminals 1, 2 and 3, (c) to identify the levels of the recognized portable terminals 1, 2 and 3, and (d) to manage information on digital image processing multifunction apparatuses A and B.

Meanwhile, the terminals 1, 2 and 3 have functions (1) to communicate with the digital image processing multifunction apparatuses A and B, (2) to manage identification information of the portable terminals 1, 2 and 3, and (3) to communicate with another external apparatus, such as electronic mail function.

In the above-described management system for an electric apparatus, when recognizing the presence of the portable terminals 1, 2 and 3, the digital image processing multifunction apparatuses A and B verify whether or not the portable terminals 1, 2 and 3 are specific terminals and report information indicative of the levels of the portable terminals 1, 2 and 3 to the portable terminals 1, 2 and 3.

Meanwhile, if the owner of the portable terminals 1, 2 and 3 is a serviceman, the portable terminals 1, 2 and 3 transmit information of the apparatus in accordance with the serviceman to the management center C via communication means such as electronic mail. If the owner of the portable terminals 1, 2 and 3 is an manager at the location where the apparatus is installed, an action is performed on the basis of information of the apparatus in accordance with the manager. Further, If the owner of the portable terminals 1, 2 and 3 is a general user, information of the apparatus in accordance with the user is provided.

Next, the management items in the management system for the digital image processing multifunction apparatus of the present embodiment will be described.

Figure 3:
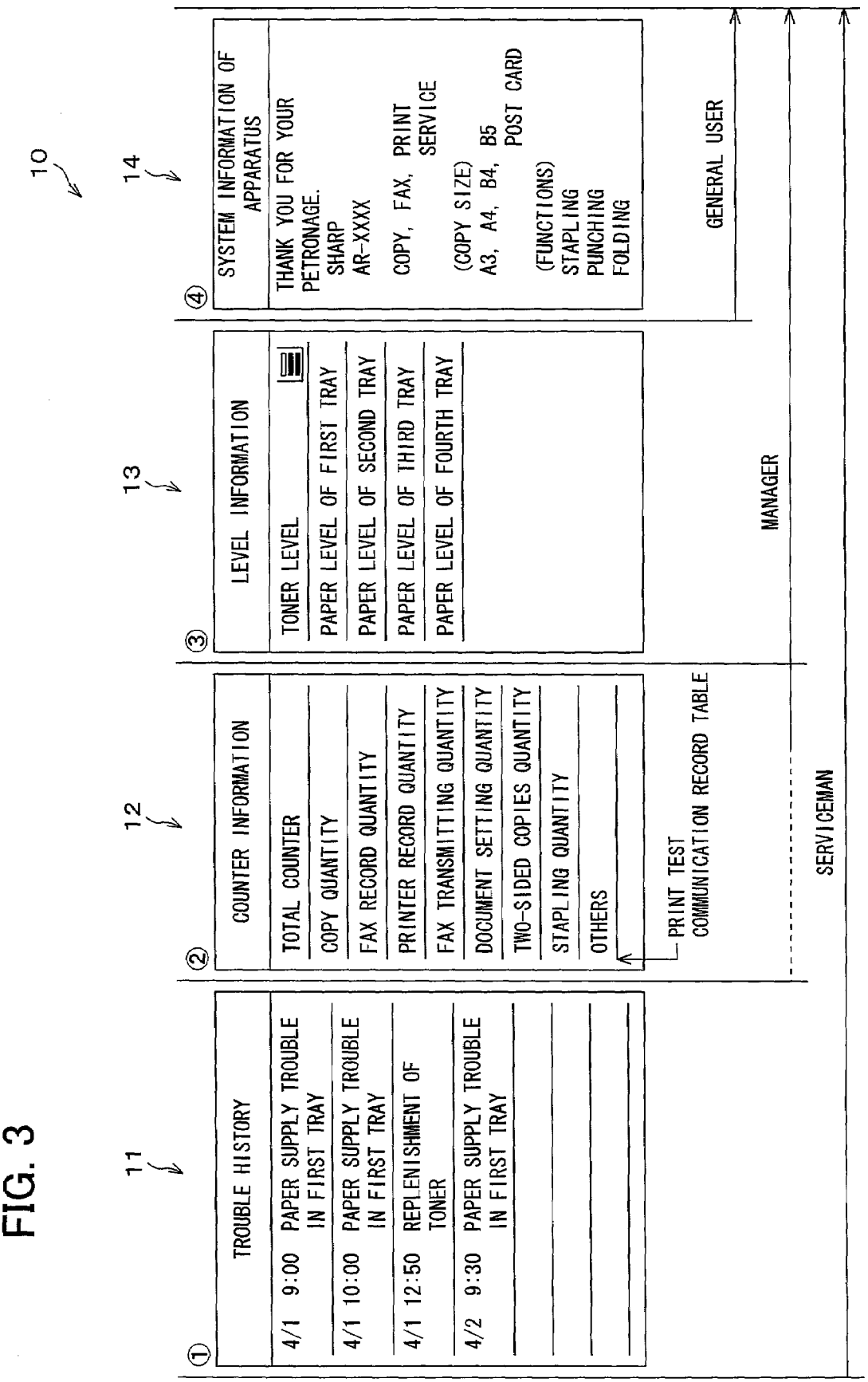
FIG. 3 is a schematic drawing illustrating an information management table stored in the digital image processing multifunction apparatus.

As shown in FIG. 3, management of the digital image processing multifunction apparatuses A and B is carried out based on a information management table 10 (in-house management information storage means). In this information management table 10, for example, trouble history information, counter information, level information of consumable goods and system information of the apparatus are listed. That is, the digital image processing multifunction apparatuses A and B store these management information by regularly performing a maintenance management of themselves.

Note that, series of information in the information management table 10 is one example, and the number of management information increases or decreases as needed.

The information management table 10 is categorized into four items. For a general user, system apparatus information 14 on the right hand is reported. For a manager at a location where the apparatus is installed, the first and second information corresponding to level information 13 and system apparatus information 14, respectively, from the right are reported. For a serviceman, all of the management information: a trouble history 11, counter information 12, level information 13, and system apparatus information 14, can be reported. Further, the counter information 12 (the second information from the right) can be also reported to a manager at a location where the apparatus is installed, as needed. Note that, a previous setting is possible such that which information in the information management table 10 can be reported to which of the portable terminals 1, 2 and 3.

Next, communication control of the portable terminals 1, 2 and 3 for management of the digital image processing multifunction apparatuses A and B, and the digital image processing multifunction apparatuses A and B will be described.

Figure 1:
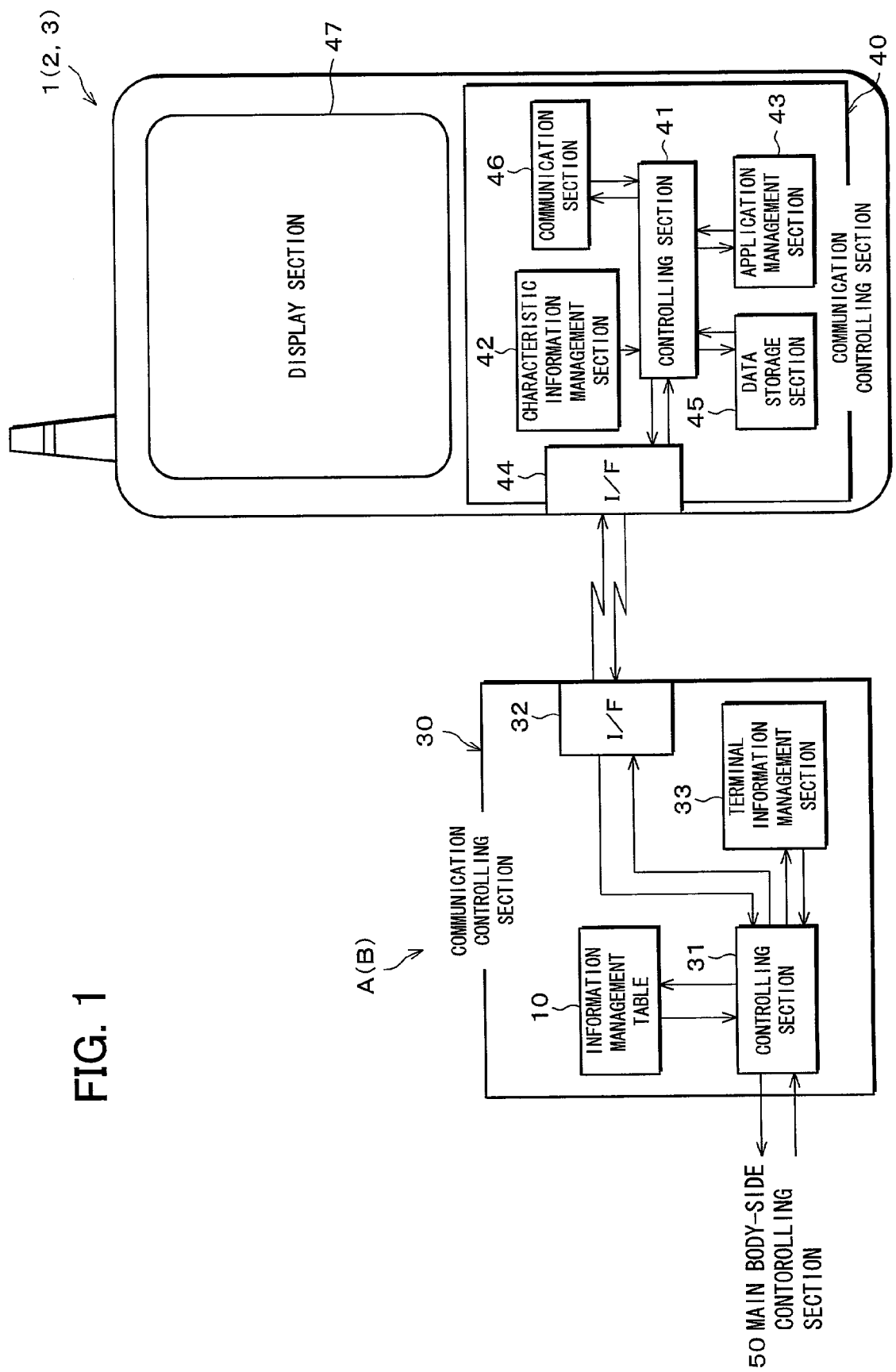
FIG. 1 is a structural drawing illustrating a digital image processing multifunction apparatus and a portable terminal of one embodiment according to the present invention.

As shown in FIG. 1, the digital image processing multifunction apparatuses A and B are respectively provided with an apparatus-side communication controlling section 30 (apparatus-side communication controlling means) to communicate with the portable terminals 1, 2 and 3. Meanwhile, the portable terminals 1, 2 and 3 are respectively provided with a terminal-side communication controlling section 40 (terminal-side communication controlling means) having an interface section 44 to communicate with the digital image processing multifunction apparatuses A and B. The interface section 44 is made up of bluetooth™ and infrared rays.

The apparatus-side communication controlling section 30 in the digital image processing multifunction apparatuses A and B is provided with an apparatus-side controlling section 31 (apparatus-side controlling means) to mainly control the apparatus-side communication controlling section 30, an information management table 10 to manage various information of the digital image processing multifunction apparatuses A and B in the form of table, an interface section 32 to communicate with the portable terminals 1, 2 and 3, and a terminal information management section 33 (identification information storage means) to manage information of specific portable terminals 1, 2 and 3 and information reporting levels set on each of the specific portable terminals 1, 2 and 3. Note that, the terminal information management section 33 further has a function acting as identification information storage means to store identification information for identifying the portable terminals 1, 2 and 3 as a communicating party. Further, the apparatus-side controlling section 31 communicate with an main body-side controlling section 50 to control a main body of the apparatus (not shown), thereby ensuring the operation of the whole electronic apparatus. That is, on a demand on the management information of the digital image processing multifunction apparatuses A and B from any one of the portable terminals 1, 2 or 3, the apparatus-side controlling section 31 is designed to identify the portable terminals 1, 2 or 3 in accordance with the identification information of the terminal information management section 33, thereafter transmits the apparatus management information in the level according to the portable terminals 1, 2 and 3, respectively.

Meanwhile, each terminal-side communication controlling section 40 in the portable terminals 1, 2 and 3 is provided with a terminal-side controlling section 41, an inherent information management section 42, an application management section 43, an interface section 44, a data storage section 45, and a communication section 46.

The terminal-side controlling section 41 has a function as terminal-side controlling means to mainly manage the terminal-side communication controlling section 40. The inherent information management unit 42 has a function as inherent information managing means to manage inherent information of the portable terminals 1, 2 and 3. The application management section 43 has a function to manage an application software operating an application for management system and other applications executed by the portable terminals 1, 2 and 3.

Further, the interface section 44 has a function to enable to communicate with the digital image processing multifunction apparatuses A and B by utilizing the application software. The data storage section 45 has a function as storage means to temporarily store and manage information of various electronic apparatuses which is transmitted through the interface section 44 of the digital image processing multifunction apparatuses A and B. The communication section 46 has a function as communication means to transmit information managed by the data storage section 45 to the external apparatus such as the management center C via the electronic mail and the like.

Note that, the portable terminals 1, 2 and 3 respectively have a display section 47 as displaying means. Therefore, starting of application, confirmation of various data, and instruction of various modes can be performed while checking on this display section 47.

Figure 4:
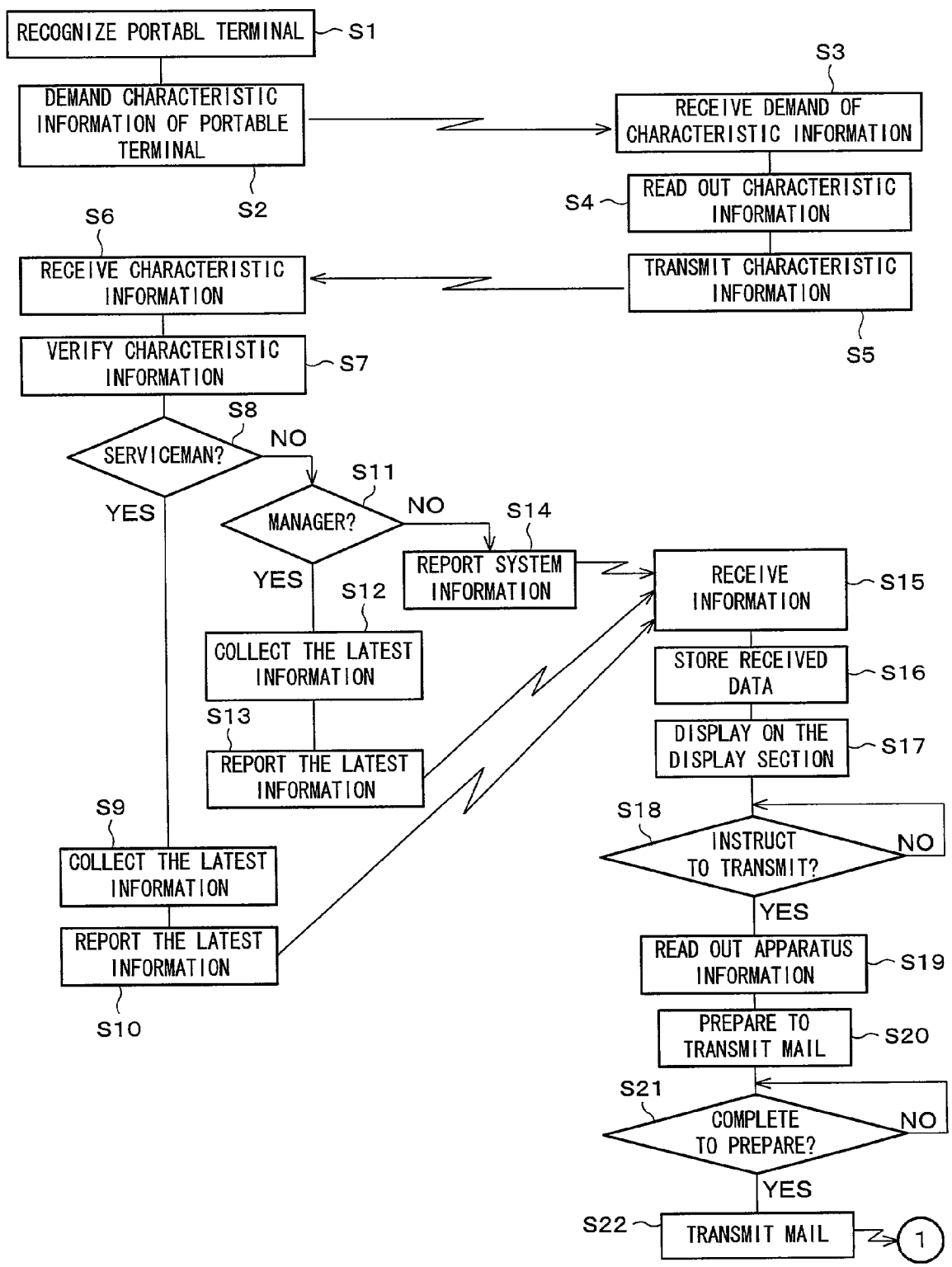
FIG. 4 is a flowchart showing steps of apparatus information management between the digital image processing multifunction apparatus and the portable terminal.
Figure 5:
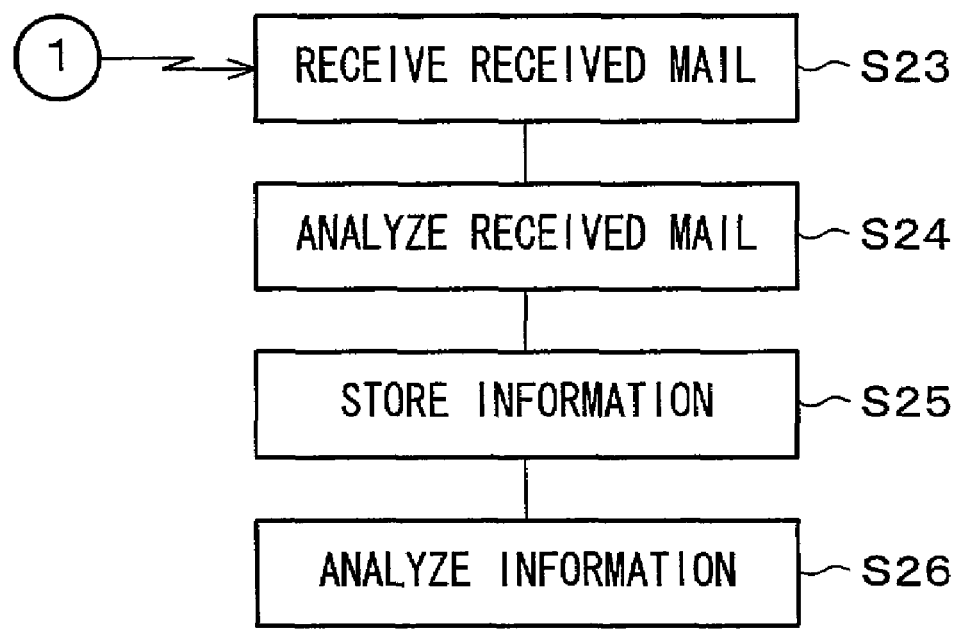
FIG. 5 is a flowchart showing steps of apparatus information management of a management center which performs management operations on the basis of an electronic mail transmitted from the portable terminal.

Next, referring to the flowcharts shown in FIG. 4 and FIG. 5, management operation of the management system in the digital image processing multifunction apparatuses A and B of the present embodiment is described below. Note that, the flowchart shown in FIG. 4 is the flowchart illustrating a processing flow of the digital image processing multifunction apparatus A and the portable terminals 1, 2 and 3 after the digital image processing multifunction apparatus A recognizes the portable terminals 1, 2 and 3. Further, in this flowchart, a processing of the digital image processing multifunction apparatus A is shown on the left side, and a processing of the portable terminals 1, 2 and 3 is shown on the right side. In addition, the flowchart shown in FIG. 5 illustrates a processing of the management center C.

First, as shown in FIG. 4, the digital image processing multifunction apparatus A recognizes the presence of the portable terminals 1, 2 and 3 by specific radio waves emitted from the portable terminals 1, 2 and 3 or by radio waves indicating each reply from the portable terminals 1, 2 and 3 which responds to specific radio waves emitted from the digital image processing multifunction apparatus A (S1), and demands identification information of the respective portable terminals 1, 2 and 3 (S2).

When receiving demand signal of the identification information via the interface section 44 (S3), the portable terminals 1, 2 and 3 read out inherent information of the portable terminals 1, 2 and 3, which is stored in inherent information management section 42, such as telephone numbers (S4). Then, each identification information of the portable terminals is transmitted from each interface section 44 of the portable terminals 1, 2 and 3 to the digital image processing multifunction apparatus A (S5). Note that, the telephone number information as the inherent information is read out in S4 since the portable terminals 1, 2 and 3 are the portable telephones in the present embodiment; however, inherent information is not necessarily limited to telephone number, other identification information may be adopted provided that the portable terminals 1, 2 and 3 are other apparatus.

Next, when receiving the inherent information of the terminal transmitted from the portable terminals 1, 2 and 3 via the interface section 32 (S6), the digital image processing multifunction apparatus A verifies whether the received inherent information is managed by the terminal information management section 33. By this verification, the transmitter is judged whether to be a serviceman, a manager or a general user (S7).

As a result of the judgement, if the transmitter is a serviceman (S8), the latest apparatus management information of the digital image processing multifunction apparatus A is organized, collected (S9), and transmitted to the portable terminal 1 as the latest information (S10). For example, in all the latest apparatus management information such as trouble history 11, the counter information 12, the level information of consumable goods 13 and the system apparatus information 14, apparatus management information relating to the latest operating condition such as information as to how they have been used and the trouble information such as paper jam is included.

As a result of the judgement, if the transmitter is a manager at the place where the apparatus is installed (S11), various information of the digital image processing multifunction apparatus A, which a manager needs to know about, such as information relating to consumable goods, for example, the remaining amount of sheets in each of sheet feeding trays and the remaining amount of developer is collected, prepared (S12), and transmitted to the portable terminal 2 as the latest information (S13).

Further, as a result of the judgement, if the transmitter is a general user, the system apparatus information 14 which is managed by the information management table 10 as information of the digital image processing multifunction apparatus A is transmitted to the portable terminal 3 (S14).

Next, when portable terminals 1, 2 and 3 receive the apparatus information transmitted from the digital image processing multifunction apparatus A via the interface section 44 (S15), the received data is temporally stored in the data storage section 45 (S16) and displayed as the received information of the digital image processing multifunction apparatus A on the display section 47 (S17). Thus, the owners of the portable terminals 1, 2 and 3 can make sure the condition of the digital image processing multifunction apparatus A. This causes that necessary actions such as a maintenance, replenishment of consumable goods, operating instruction are taken with ease in accordance with the information.

Further, if the receiver of the information is the portable terminal 1 or the portable apparatus 2 of which owners are respectively a serviceman and a manager, the above verified information of the digital image processing multifunction apparatus A is transmitted from the portable terminals 1 or 2 through a communication network such as the electronic mail.

More specifically, when receiving an instruction that the information of the apparatus should be transmitted to the management center C during executing the application of the portable terminals 1 and 2 (S18), the information received from the digital image processing multifunction apparatus A, which is stored in the data storage section 45 of the portable terminals 1 and 2, is read out (S19) and prepared for transmitting by converting the information into the format of an electronic mail or attaching to an electronic mail (S20). When preparation for transmitting the information to the management center C by electronic mail is completed (S21), the electronic mail relating to the information of the digital image processing multifunction apparatus A is transmitted (S22) to the management center C.

Meanwhile, as shown in FIG. 5, when receiving the electronic mail from the portable terminals 1 and 2 (S23), the management center C analyzes (S24) and stores (S25) the analyzed result as the information of the apparatus relating to the places where the digital image processing multifunction apparatuses A and B are installed. As a result, on the basis of such stored information, it is possible for the management center C, for example, to manage maintenance, replenish consumable goods and charge for payment based on the used frequency for each of the digital image processing multifunction apparatuses A and B (S26).

The above system makes it possible to link an electronic apparatus without the network environment to the management center C which performs centralized management of the apparatus information. That is, the above system makes it possible to perform the centralized management of the digital image processing multifunction apparatuses A and B which are installed at a plurality of locations similarly to the electronic apparatus under network environment.

Note that, in the present embodiment, the serviceman visits the locations where each of the digital image processing multifunction apparatuses A and B are installed so as to collect information of the digital image processing multifunction apparatuses A and B in the portable terminal 1 of the serviceman. However, the present invention is not limited to this. It is possible to give the right to report the latest information of the digital image processing multifunction apparatuses A and B to the management center C for the managers at the locations where the digital image processing multifunction apparatuses A and B are installed, instead. Accordingly, if the manager regularly transmits the latest apparatus information to the management center C, the management center C can take proper actions such as visiting for a maintenance and sending out consumable goods.

Thus, a method for managing digital image processing multifunction apparatuses A and B according to the present embodiment makes it possible to acquire apparatus management information of the digital image processing multifunction apparatuses A and B via the portable terminals 1, 2 and 3 such as portable telephones.

In this case, in the present embodiment, when the portable terminals 1, 2 and 3 demand the apparatus management information of the digital image processing multifunction apparatuses A and B, the digital image processing multifunction apparatuses A and B verify the identification information of the portable terminals 1, 2 and 3 and transmit the apparatus management information in accordance with the portable terminals 1, 2 and 3.

Thus, it is possible to limit the content of the apparatus management information of the digital image processing multifunction apparatuses A and B to be reported in accordance with the apparatus management levels of owners, for example, a serviceman, a manager, and a general user, of the portable terminals 1, 2 and 3 who demanded the apparatus management information.

As a result, it is possible to acquire apparatus management information of the digital image processing multifunction apparatuses A and B via the portable terminals 1, 2 and 3 such as a portable telephone which has been recently popular among people, and it is possible to report apparatus management information in accordance with the apparatus management levels of owners of the portable terminals 1, 2 and 3.

Therefore, in case where it is difficult to install and manage digital image processing multifunction apparatuses A and B under a network environment, it is possible to provide management system for the digital image processing multifunction apparatuses A and B which can collect apparatus management information relating to electronic apparatuses easily and efficiently by utilizing portable terminals such as portable telephones which currently most people subscribe for so as to perform a proper action promptly, without introducing a network environment.

Further, in a method for managing the digital image processing multifunction apparatuses A and B of the present embodiment, the digital image processing multifunction apparatuses A and B regularly perform a maintenance management of themselves and store the apparatus management information, for example, such as the used frequency of the apparatus and the trouble history.

Thus, it is possible to regularly collect the apparatus management information such as the used frequency of the apparatus and the trouble history, and perform proper actions for general users of the digital image processing multifunction apparatuses A and B.

Further, in a method for managing the digital image processing multifunction apparatuses A and B of the present embodiment, the portable terminals 1 and 2 transmit the acquired apparatus management information to the management center C where the management of a plurality of digital image processing multifunction apparatuses A and B is performed synthetically.

Thus, it is possible to further report the apparatus management information of the digital image processing multifunction apparatuses A and B, which was reported to the portable terminals 1 and 2, to the management center C. Thus, even when the digital image processing multifunction apparatuses A and B are not under the network environment, it is possible to report the apparatus management information via the portable terminals 1 and 2 without a network environment. Therefore, it is possible to carry out the remote management of the digital image processing multifunction apparatuses A and B. Note that, it is possible to set so as to make general users owning the portable terminal 3 report to the management center C if any trouble occurs.

In a method for managing the digital image processing multifunction apparatuses A and B of the present embodiment, the digital image processing multifunction apparatuses A and B transmit the latest apparatus management information to the portable terminals 1 and 2 on the basis of the identification information of the portable terminals 1 and 2 which demanded the apparatus management information of the digital image processing multifunction apparatuses A and B.

Thus, it is possible to collect the latest apparatus management information automatically to report when the apparatus management levels of the portable terminals 1 and 2 are recognized.

In a method for managing the digital image processing multifunction apparatuses A and B of the present embodiment, the digital image processing multifunction apparatuses A and B transmit the apparatus management information relating to consumable goods to the portable terminals 1 and 2 on the basis of the identification information of the portable terminals 1 and 2 which demanded the apparatus management information with respect to the digital image processing multifunction apparatuses A and B.

Thus, for example, when the portable terminal is recognized to be the portable terminal 1 owned by a serviceman of the digital image processing multifunction apparatus A and B or the portable terminal 2 owned by a manager, the apparatus management information, having apparatus management levels, with which a serviceman and a manager can cope is reported to the portable terminals 1 and 2, thereby ensuring proper management of the digital image processing multifunction apparatuses A and B. As a result, the rate of operation of the digital image processing multifunction apparatuses A and B improves.

Further, in a method for managing the digital image processing multifunction apparatuses A and B of the present embodiment, for example, when the portable terminal is recognized to be the portable terminal 1 owned by a serviceman of the digital image processing multifunction apparatuses A and B, the apparatus management information relating to the latest operating condition such as information as to how they have been used and the trouble information such as a paper jam is reported to the portable terminal 1. This enables a serviceman to perform proper actions, such as a maintenance and a replacement of parts in accordance with the present condition of the digital image processing multifunction apparatuses A and B.

Further, the digital image processing multifunction apparatuses A and B of the present embodiment is provided with the apparatus-side communication controlling section 30 for communicating with either of the portable terminals 1, 2 and 3 such as portable telephones. The apparatus-side communication controlling section 30 includes the information management table 10 for storing the apparatus management information of the apparatus in plural levels, the terminal information management section 33 for storing identification information to identify portable terminals 1, 2 and 3 of a communicating party, apparatus-side controlling section 31 for identifying the portable terminals 1, 2 and 3 on the basis of the identification information in the terminal information management section 33 in the case of a demand for the apparatus management information of the apparatus from either of portable terminals 1, 2 and 3, and transmitting the apparatus management information of the level in accordance with the portable terminal from the information management table 10.

Thus, it is possible to limit the content of the apparatus management information of the digital image processing multifunction apparatuses A and B to be reported in accordance with the apparatus management levels of owners, for example, a serviceman, a manager, and a general user, of the portable terminals 1, 2 and 3 who demanded the apparatus management information.

As a result, it is possible to acquire apparatus management information of the digital image processing multifunction apparatuses A and B via the portable terminals 1, 2 and 3 such as a portable telephone which has been recently popular among people, and it is possible to report apparatus management information in accordance with the apparatus management levels of owners of the portable terminals 1, 2 and 3.

Therefore, in case where it is difficult to install and manage digital image processing multifunction apparatuses A and B under a network environment, it is possible to provide digital image processing multifunction apparatuses A and B which can collect apparatus management information relating to electronic apparatuses easily and efficiently by utilizing portable terminals such as portable telephones which currently most people subscribe for so as to perform a proper action promptly, without introducing a network environment.

Further, the digital image processing multifunction apparatuses A and B of the present embodiment regularly perform a maintenance management of themselves and store the apparatus management information, for example, such as a frequency of the apparatus used and a trouble history in the information management table 10.

Thus, it is possible to regularly collect the apparatus management information such as the used frequency of the apparatus and the trouble history, and perform proper actions for general users of the digital image processing multifunction apparatuses A and B.

Further, the digital image processing multifunction apparatuses A and B of the present embodiment can transmit the apparatus management information relating to consumable goods, for example, to the portable terminal 2 stored in the information management table 10 on the basis of the identification information of the portable terminal 2 which demanded the apparatus management information with respect to the digital image processing multifunction apparatuses A and B.

Thus, for example, when the portable terminal is recognized to be the portable terminal 2 owned by a manager, the apparatus management information in the apparatus management level with which the manager can cope is reported to the portable terminal 2, thereby ensuring proper management of the digital image processing multifunction apparatuses A and B. As a result, the rate of operation of the digital image processing multifunction apparatuses A and B improves.

Further, in the digital image processing multifunction apparatuses A and B of the present embodiment, for example, when the portable terminal is recognized to be the portable terminal 1 owned by a serviceman of the digital image processing multifunction apparatuses A and B, the apparatus management information relating to the latest operating condition such as information as to how they have been used and the trouble information such as a paper jam stored in the information management table 10 can be reported to the portable terminal 1. This enables a serviceman to perform proper actions such as a maintenance and a replacement of parts in accordance with the present condition of the digital image processing multifunction apparatuses A and B.

Yet further, in the management system for the digital image processing multifunction apparatuses A and B of the present embodiment, a plurality of digital image processing multifunction apparatuses A and B, the management center C for synthetically performing management of the plurality of digital image processing multifunction apparatuses A and B, and the portable terminals 1, 2 and 3 having the terminal-side communication controlling section 40 and the display section 47 are provided.

The terminal-side communication controlling section 40 includes the inherent information management section 42 for storing identification information of the portable terminals 1, 2 and 3, application management section 43 for storing application softs relating to acquisition of the apparatus management information of the digital image processing multifunction apparatuses A and B and transmission to the management center C, data storage section for storing the apparatus management information transmitted from the digital image processing multifunction apparatuses A and B, communication section for communicating, terminal-side controlling section 41 for communicating with either of the digital image processing multifunction apparatuses A and B in order to acquire the apparatus management information, displaying the acquired apparatus management information on the display section 47, storing the acquired apparatus management information in the data storage section 45, and enabling to transmit the apparatus management information stored in the data storage section 45 to the management center C.

Thus, it is possible to acquire the apparatus management information of the digital image processing multifunction apparatuses A and B via the portable terminals 1, 2 and 3 such as a portable telephone which has recently been popular among people, and it is possible to report the apparatus management information in accordance with the apparatus management levels of owners of the portable terminals 1, 2 and 3.

Further, in the present embodiment, it is possible to report the apparatus management information of the digital image processing multifunction apparatuses A and B, which was reported to the portable terminals 1 and 2, to the management center C. Thus, even when the digital image processing multifunction apparatuses A and B are not under the network environment, it is possible to report the apparatus management information via the portable terminals 1 and 2 without a network environment. As a result, it is possible to carry out the remote management of the digital image processing multifunction apparatuses A and B.

Therefore, in case where it is difficult to install and manage digital image processing multifunction apparatuses A and B under a network environment, it is possible to provide management system for the digital image processing multifunction apparatuses A and B which can collect apparatus management information relating to electronic apparatuses easily and efficiently by utilizing portable terminals 1 and 2 such as portable telephones which currently most people subscribe for so as to perform a proper action promptly, without introducing a network environment.

Note that, in the method for managing the electronic apparatus according to the present invention, the electronic apparatus can regularly perform a maintenance management of the electronic apparatus and store the apparatus management information.

Thus, it is possible to regularly collect the apparatus management information such as the used frequency of the apparatus and the trouble history, and to perform proper actions for general users of the electronic apparatus.

Further, in the method for managing the electronic apparatus according to the present invention, the electronic apparatus can transmit the apparatus management information which was acquired to the apparatus management center where the apparatus management of a plurality of electronic apparatuses is performed synthetically.

Thus, it is possible to further report the apparatus management information of the electronic apparatuses, which was reported to the portable terminals, to the apparatus management center. Thus, even when the electronic apparatuses are not under the network environment, it is possible to report the apparatus management information to the apparatus management information via the portable terminals without the network environment. Therefore, it is possible to carry out the remote management of the electronic apparatus.

Further, in the method for managing the electronic apparatus of the present invention, the electronic apparatus can transmit the latest apparatus management information to the portable terminals on the basis of the identification information of the portable terminals which demanded the apparatus management information with respect to the electronic apparatus.

Thus, it is possible to collect the latest apparatus management information automatically to report at the stage that the apparatus management levels of the portable terminals are verified.

In the method for managing the electronic apparatus of the present invention, the electronic apparatus can transmit the apparatus management information relating to consumable goods to the portable terminals on the basis of the identification information of the portable terminals which demanded the apparatus management information with respect to the electronic apparatus.

Thus, for example, when the portable terminal is recognized to be the portable terminal owned by a manager, the apparatus management information, having apparatus management level, with which a manager can cope is reported to the portable terminal, thereby ensuring proper management of the electronic apparatus. As a result, the rate of operation of the electronic apparatus improves.

Further, in the method for managing the electronic apparatus of the present invention, for example, the electronic apparatus can transmit the apparatus management information relating to the latest operating condition such as information as to how it has been used and the trouble information such as a paper jam on the basis of identification information of the portable terminals which demanded the apparatus management information with respect to the electronic apparatus.

According to this invention, for example, when the portable terminal is recognized to be the portable terminal owned by a serviceman of the electronic apparatus, the apparatus management information relating to the latest operating condition such as information as to how it has been used and the trouble information such as a paper jam is reported to the portable terminal. This enables a serviceman to perform proper actions such as a maintenance and a replacement of parts in accordance with the present condition of the electronic apparatus.

Further, in the electronic apparatus of the present invention, inside-apparatus management information storage means can regularly store maintenance management information.

According to this invention, the electronic apparatus can regularly perform a maintenance management of the electronic apparatus and store the apparatus management information such as the used frequency of the apparatus and the trouble history in the inside-apparatus management information storage means.

Thus, it is possible to regularly collect the apparatus management information such as the used frequency of the apparatus and the trouble history by the portable terminal, and to perform proper actions for general users of the electronic apparatus.

Further, in the electronic apparatus of the present invention, the inside-apparatus management information storage means can store the apparatus management information relating to consumable goods.

According to this invention, the electronic apparatus can transmit the apparatus management information relating to consumable goods stored in the inside-apparatus management information storage means to the portable terminal on the basis of the identification information of the portable terminal which demanded the apparatus management information with respect to the electronic apparatus.

Thus, for example, when the portable terminal is recognized to be the portable terminal owned by a manager, the apparatus management information, having apparatus management level, with which a manager can cope is reported to the portable terminal, thereby ensuring proper management of the electronic apparatus. As a result, the rate of operation of the electronic apparatus improves.

Further, the electronic apparatus of the present invention includes the inside-apparatus management information storage means where the apparatus management information relating to the latest operating condition such as information as to how it has been used and the trouble information such as a paper jam can be stored.

According to this invention, for example, when the portable terminal is recognized to be the portable terminal owned by a serviceman of the electronic apparatus, the apparatus management information relating to the latest operating condition such as information as to how it has been used and the trouble information such as a paper jam stored in the inside-apparatus management information storage means can be reported to the portable terminal. This enables a serviceman to perform proper actions such as a maintenance and a replacement of parts in accordance with the present condition of the electronic apparatus.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. An electronic apparatus, comprising apparatus-side communication controlling means for communicating with at least one portable terminal, the apparatus-side communication controlling means including:
   inside-apparatus management information storage means for storing the apparatus management information of a main body of the electronic apparatus in plural levels,
   identification information storage means for storing identification information to identify the portable terminal of a communicating party, and
   apparatus-side controlling means for identifying the portable terminal in accordance with the identification information in the identification information storage means when a demand for the apparatus management information of the electronic apparatus from the portable terminal, and for transmitting the apparatus management information that includes apparatus-specific maintenance information of the associated electronic apparatus of the level in accordance with the portable terminal from the inside-apparatus management information storage means, wherein verification of the identification information of the portable terminal is carried out entirely in the electronic apparatus.

2. The electronic apparatus according to claim 1, wherein the inside-apparatus management information storage means regularly stores maintenance management information.

3. The electronic apparatus according to claim 1, wherein the inside-apparatus management information storage means stores the apparatus management information relating to consumable goods.

4. The electronic apparatus according to claim 1, wherein the inside-apparatus management information storage means stores the apparatus management information relating to the latest operating condition.

5. The electronic apparatus according to claim 1, wherein the electronic apparatus is used to perform at least one of copying, printing, and facsimile.

6. The electronic apparatus according to claim 1, wherein the apparatus management information is supplied to the portable terminal without input by a user.

7. The electronic apparatus according to claim 2, wherein the inside-apparatus management information storage means stores the apparatus management information relating to consumable goods.

8. The electronic apparatus according to claim 2, wherein the inside-apparatus management information storage means stores the apparatus management information relating to the latest operating condition.

9. A management system, comprising:
   at least one electronic apparatus, said electronic apparatus including:
   apparatus-side communication controlling means for communicating with at least one portable terminal, the apparatus-side communication controlling means including:
   inside-apparatus management information storage means for storing the apparatus management information of a main body of the electronic apparatus in plural levels,
   identification information storage means for storing identification information to identify the portable terminal of a communicating party,
   apparatus-side controlling means for identifying the portable terminal in accordance with the identification information in the identification information storage means when a demand for the apparatus management information of the electronic apparatus from the portable terminal, and for transmitting the apparatus management information that includes apparatus-specific maintenance information of the associated electronic apparatus of the level in accordance with the portable terminal from the inside-apparatus management information storage means,
   an apparatus management center where management of the plurality of electronic apparatuses is performed synthetically,
   terminal-side communication controlling means, and
   the portable terminal having a display section, the terminal-side communication controlling means, further including:
   inherent information management means for storing identification information of the portable terminal, application means for storing application software relating to acquisition of apparatus management information of the electronic apparatus and transmission to the apparatus management center,
   storage means for storing the apparatus management information transmitted from the electronic apparatuses,
   communication means for communicating, and
   terminal-side controlling means for, based on the application software stored in the application means, (a) communicating with the electronic apparatus so as to acquire the apparatus management information, (b) displaying the apparatus management information that has been acquired on a display section, (c) storing the apparatus management information thus acquired in the storage means, and (d) enabling to transmit the apparatus management information stored in the storage means to the apparatus management center.

10. The electronic apparatus according to claim 9, wherein the electronic apparatus is used to perform at least one of copying, printing, and facsimile.

11. The electronic apparatus according to claim 9, wherein the apparatus management information is supplied to the portable terminal without input by a user.

* * * * *